United States Patent [19]

Meyers

[11] Patent Number: 5,376,388
[45] Date of Patent: Dec. 27, 1994

[54] USE OF EDIBLE FILM TO IMPROVE THE PACKAGING OF CHEWING GUM

[75] Inventor: Marc Meyers, Naperville, Ill.

[73] Assignee: The Wm. Wrigley Jr. Company, Chicago, Ill.

[21] Appl. No.: 49,805

[22] Filed: Apr. 20, 1993

Related U.S. Application Data

[63] Continuation-in-part of Ser. No. 871,962, Apr. 21, 1992.

[51] Int. Cl.$^5$ .............................................. A23G 3/30
[52] U.S. Cl. .................................. 426/5; 426/138; 426/302; 426/303; 426/310; 426/307; 426/123
[58] Field of Search ............................ 426/3–6, 426/302, 303, 310, 304, 138, 123, 307

[56] References Cited

U.S. PATENT DOCUMENTS

| | | | |
|---|---|---|---|
| 2,208,229 | 7/1940 | Ranney | 206/56 |
| 2,306,191 | 12/1942 | Saladin | 93/7 |
| 2,968,139 | 1/1961 | Mehlhorn et al. | 53/223 |
| 3,352,085 | 11/1967 | Patenburg | 53/321 |
| 3,969,513 | 7/1976 | Canonne | 426/5 |
| 4,105,801 | 8/1978 | Dogliotti | 426/99 |
| 4,117,173 | 9/1978 | Schiweck et al. | 426/548 |
| 4,127,677 | 11/1978 | Fronczkowski et al. | 426/5 |
| 4,146,653 | 3/1979 | Mader et al. | 426/548 |
| 4,224,219 | 9/1980 | Van Blanton et al. | 260/112 |
| 4,317,838 | 3/1982 | Cherukuri et al. | 426/5 |
| 4,323,588 | 4/1982 | Vink et al. | 426/564 |
| 4,359,531 | 11/1982 | Bucke et al. | 426/658 |
| 4,423,086 | 12/1983 | Devos et al. | 426/548 |
| 4,567,053 | 1/1986 | Lindley | 426/538 |
| 4,587,119 | 5/1986 | Bucke et al. | 424/48 |
| 4,661,359 | 4/1987 | Seaborne et al. | 426/89 |
| 4,681,766 | 6/1987 | Huzinec et al. | 426/5 |
| 4,693,974 | 9/1987 | Schwengers et al. | 435/97 |
| 4,786,511 | 11/1988 | Huzinec et al. | 426/5 |
| 4,792,453 | 12/1988 | Reed et al. | 426/5 |
| 4,828,845 | 5/1989 | Zamudio-Tena et al. | 426/5 |
| 4,915,971 | 4/1990 | Fennema et al. | 426/578 |
| 4,931,294 | 6/1990 | Yatka et al. | 426/3 |
| 4,961,935 | 10/1990 | Cherukuri et al. | 426/3 |
| 4,976,972 | 12/1990 | Patel et al. | 426/3 |
| 5,048,260 | 9/1991 | Raymond et al. | 53/370.8 |
| 5,089,307 | 2/1992 | Ninomiya et al. | 426/138 |
| 5,130,150 | 7/1992 | Averbach | 426/99 |
| 5,130,151 | 7/1992 | Averbach | 426/99 |

FOREIGN PATENT DOCUMENTS

| | | |
|---|---|---|
| 0273000 | 6/1988 | European Pat. Off. . |
| 0298768 | 1/1989 | European Pat. Off. . |
| 0035067 | 7/1989 | European Pat. Off. . |
| 0328849 | 8/1989 | European Pat. Off. . |
| 2624697 | 7/1989 | France . |
| 63-24856 | 2/1988 | Japan . |
| WO89/03170 | 4/1989 | WIPO . |
| WO90/06061 | 6/1990 | WIPO . |
| WO90/07864 | 7/1990 | WIPO . |
| WO90/13994 | 11/1990 | WIPO . |
| WO91/03147 | 3/1991 | WIPO . |

OTHER PUBLICATIONS

Brochure: "Palatinit Infopac", Sussungsmittel GmbH (1984).

*Primary Examiner*—Jeanette Hunter
*Attorney, Agent, or Firm*—Hill, Steadman & Simpson

[57] ABSTRACT

An improved method for preparing chewing gum and the packaging of same is provided. To this end, a method for packaging at least one stick of chewing gum is provided comprising the steps of preparing a stick of chewing gum that includes a coating of an edible material that provides sufficient vapor barrier properties to provide the stick of chewing gum with a more stable moisture content at ambient conditions than a stick of chewing gum that does not include the coating, and wrapping the stick of chewing gum in a wrapper that does not include any metal foil material to create a wrapped stick of chewing gum. The sticks of chewing gum can then be packaged in a counterband.

21 Claims, 14 Drawing Sheets

COMPARISON OF WAX COATING
LEVELS ON BARRIER PERFORMANCE
(WITH 0.9 MIL/SIDE HPMC PRE-COAT)

BEESWAX
- CONTROL
- 0.9 MIL
- 1.65 MIL
- 3.0 MIL (COATING THICKNESS IN MILS PER EACH SIDE OF THE STICK)

ACCEL. AGED 58% RH/85 F

COMPARISON OF WAX COATING
LEVELS ON BARRIER PERFORMANCE
(NO HPMC PRE-COAT)

BEESWAX

— CNTRL1   + CNTRL 2   -□- 0.9 MIL
-✕- 1.65 MIL   -◇- 2.0 MIL   -△- 3.0 MIL (COATING THICKNESS IN MILS PER EACH SIDE OF THE STICK)

ACCEL. AGED 58% RH /85F

CNTRL1 = PRODUCTION
CNTRL2 = ROLLING COMP'D. REMOVED

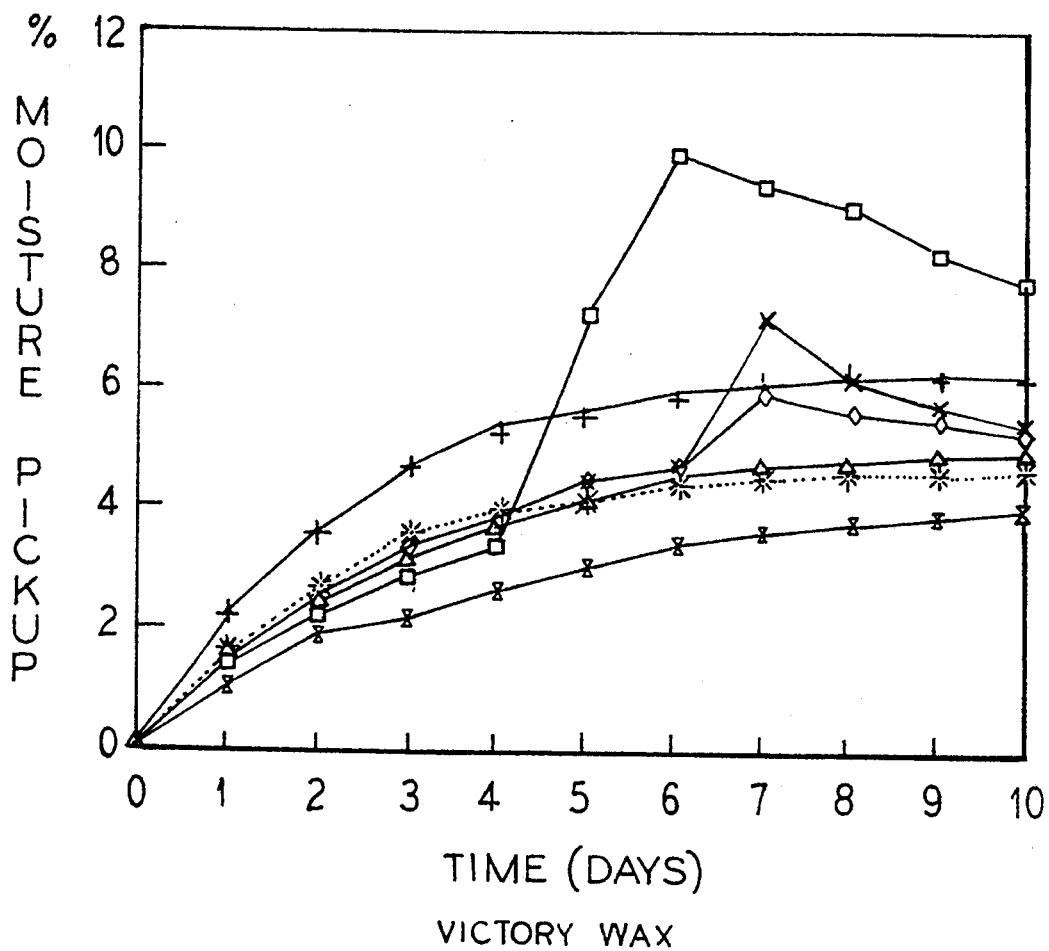

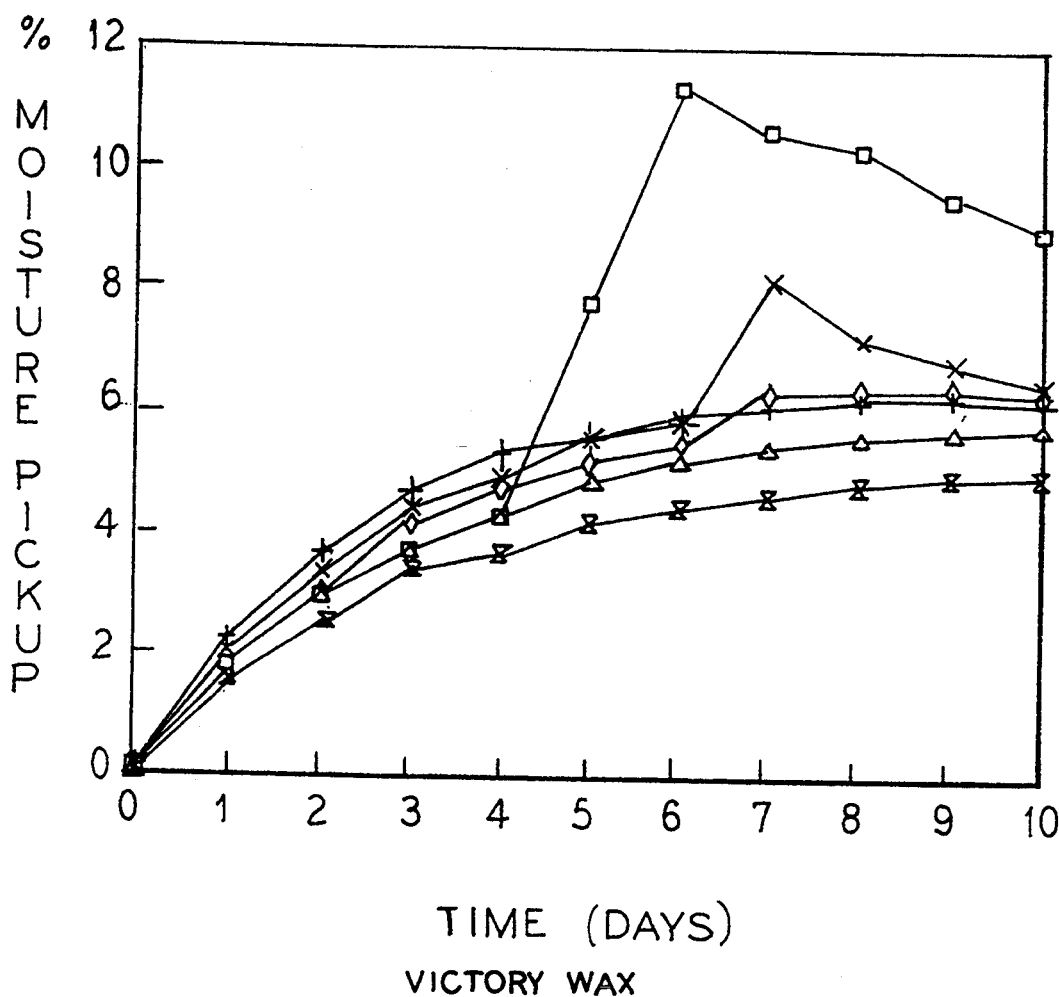

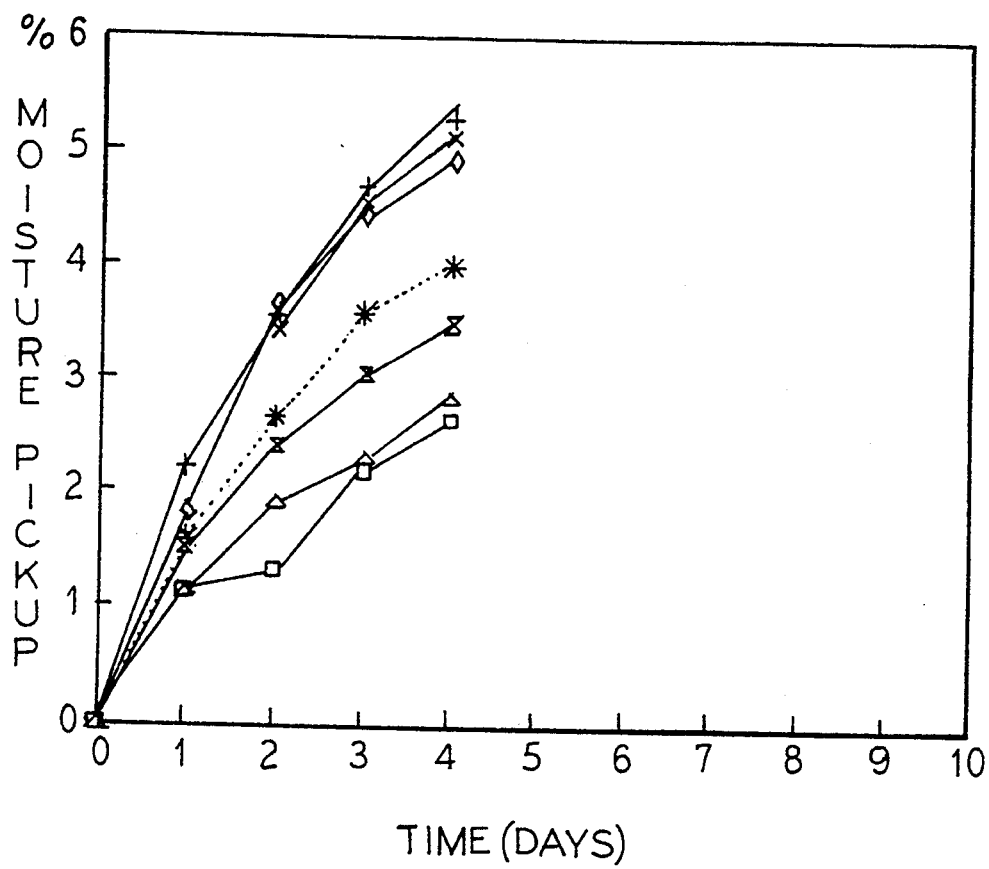

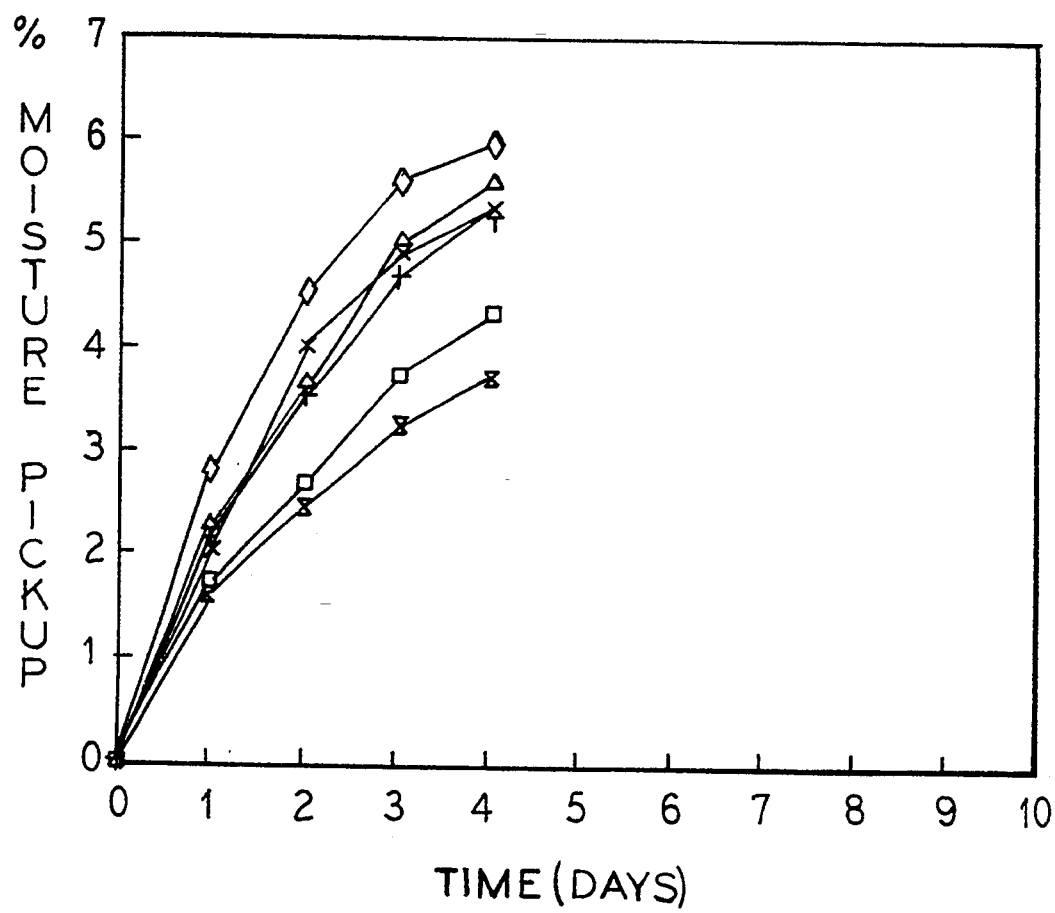

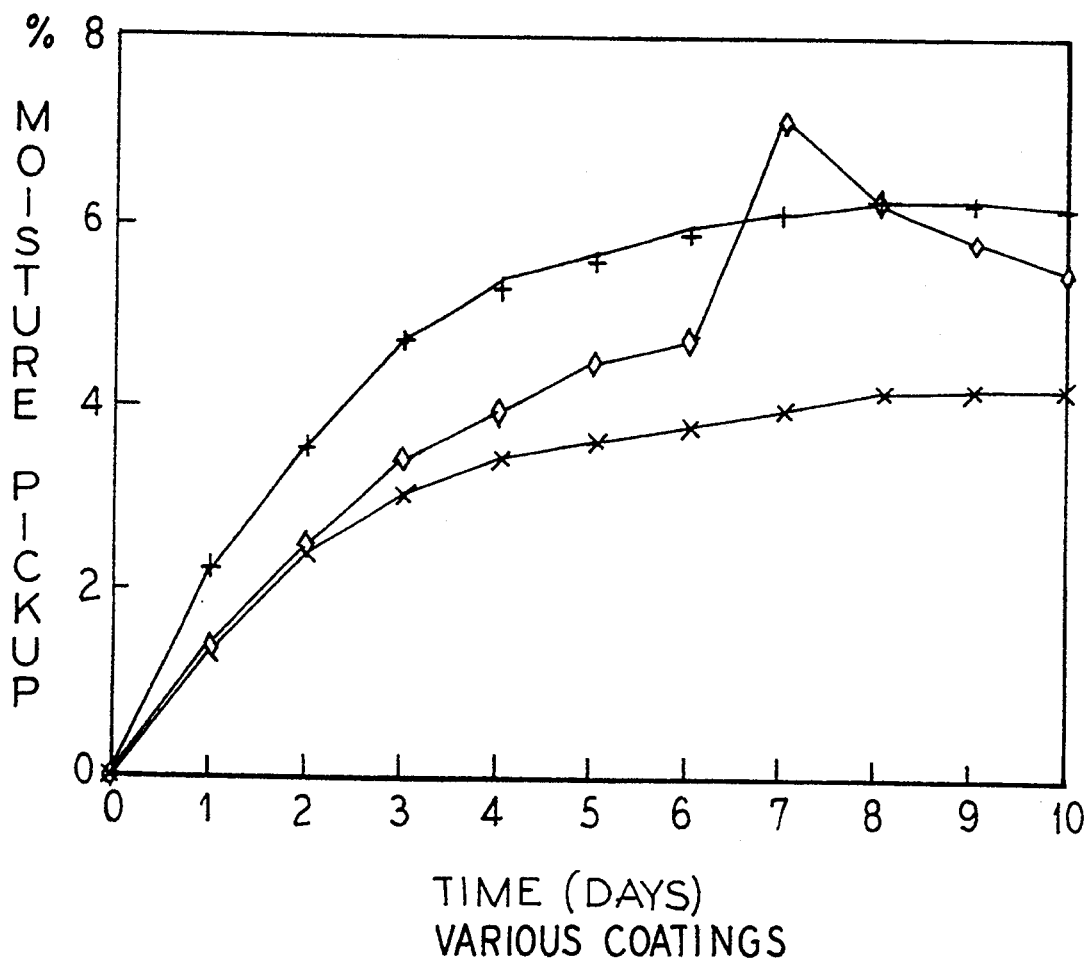

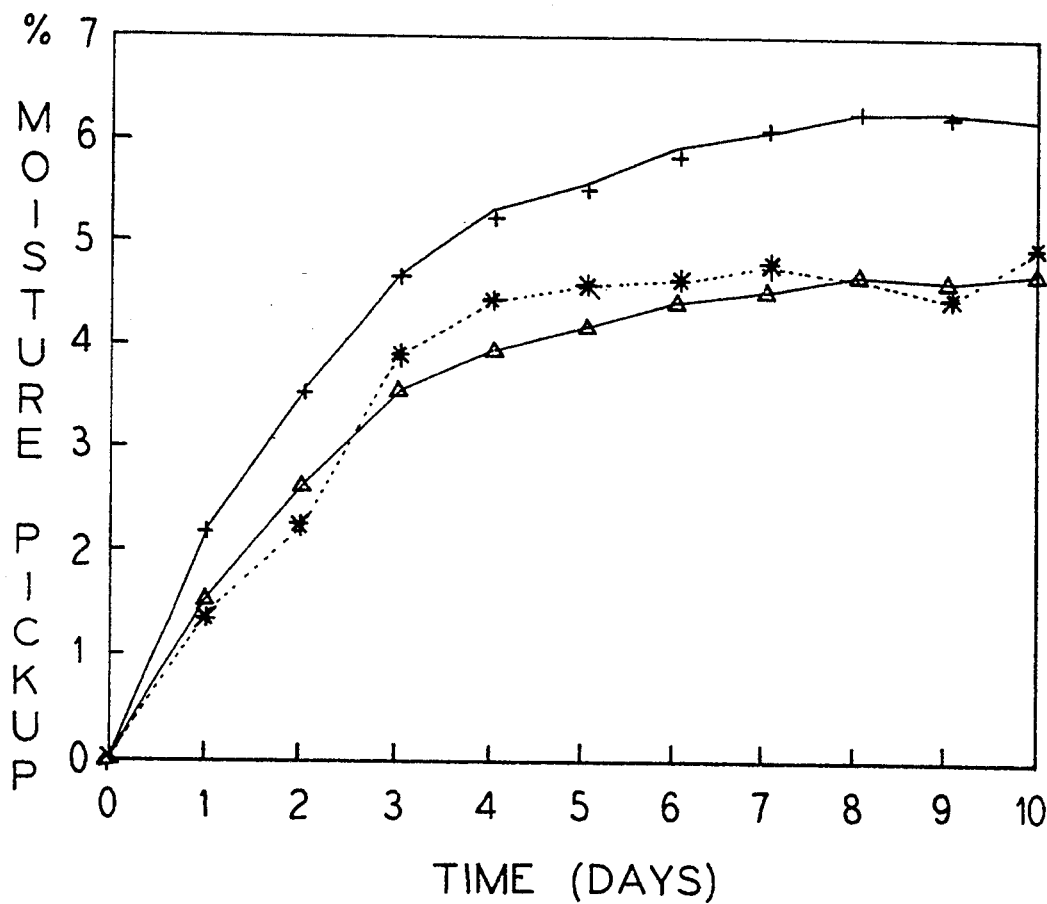
FIG. 13 — Comparison of wax coating levels on barrier performance (prepared vs. unprepared gum)

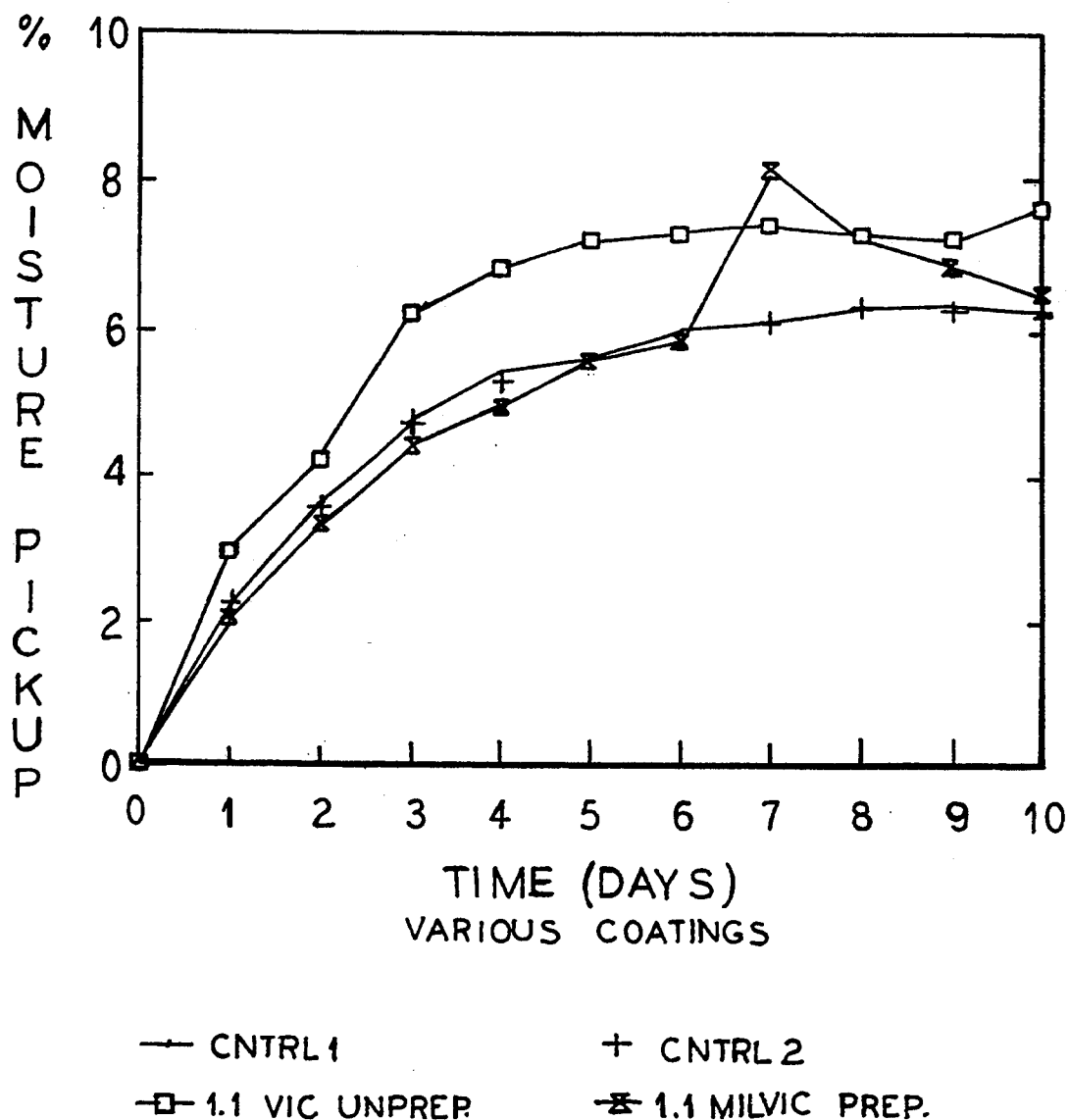

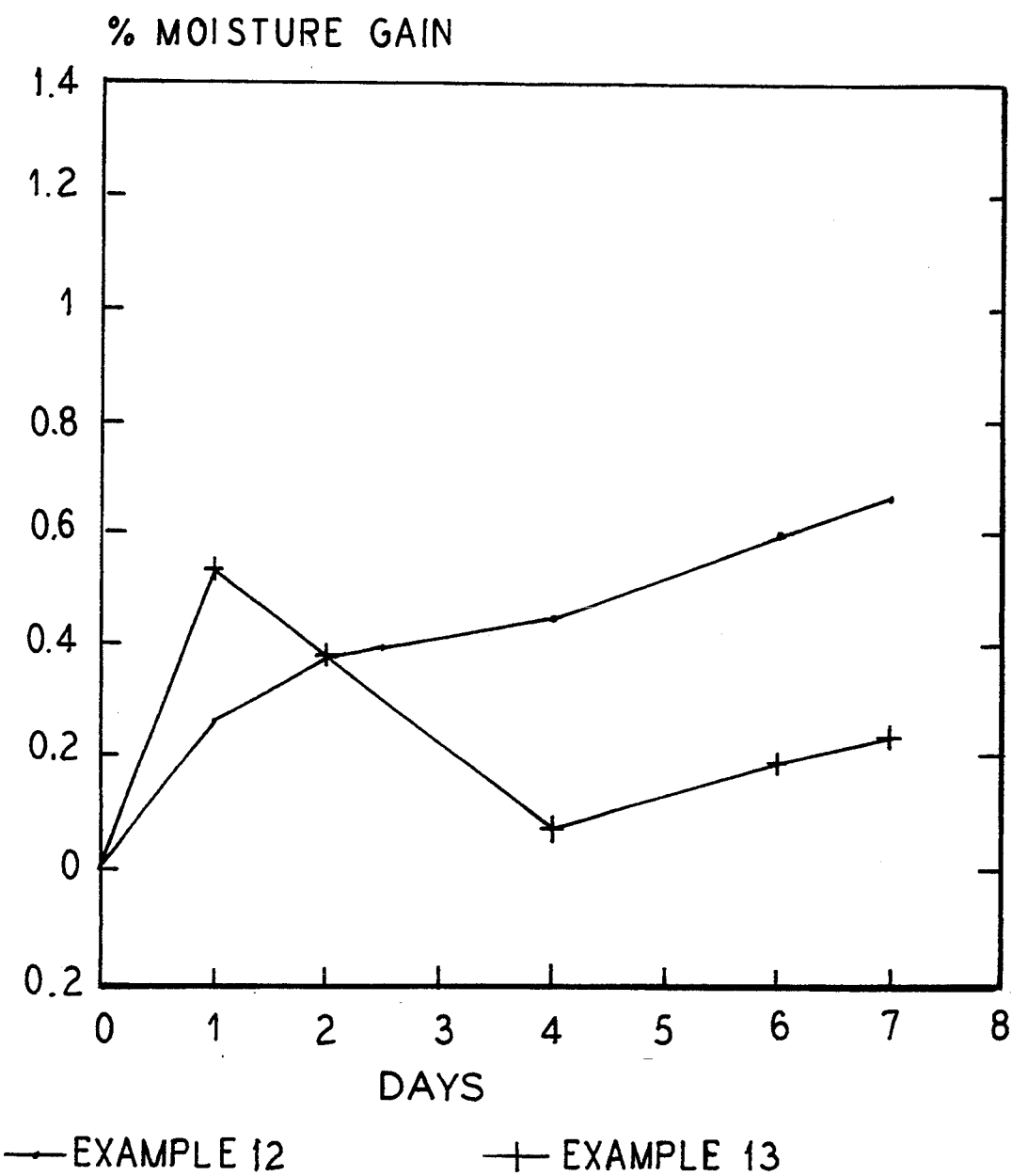

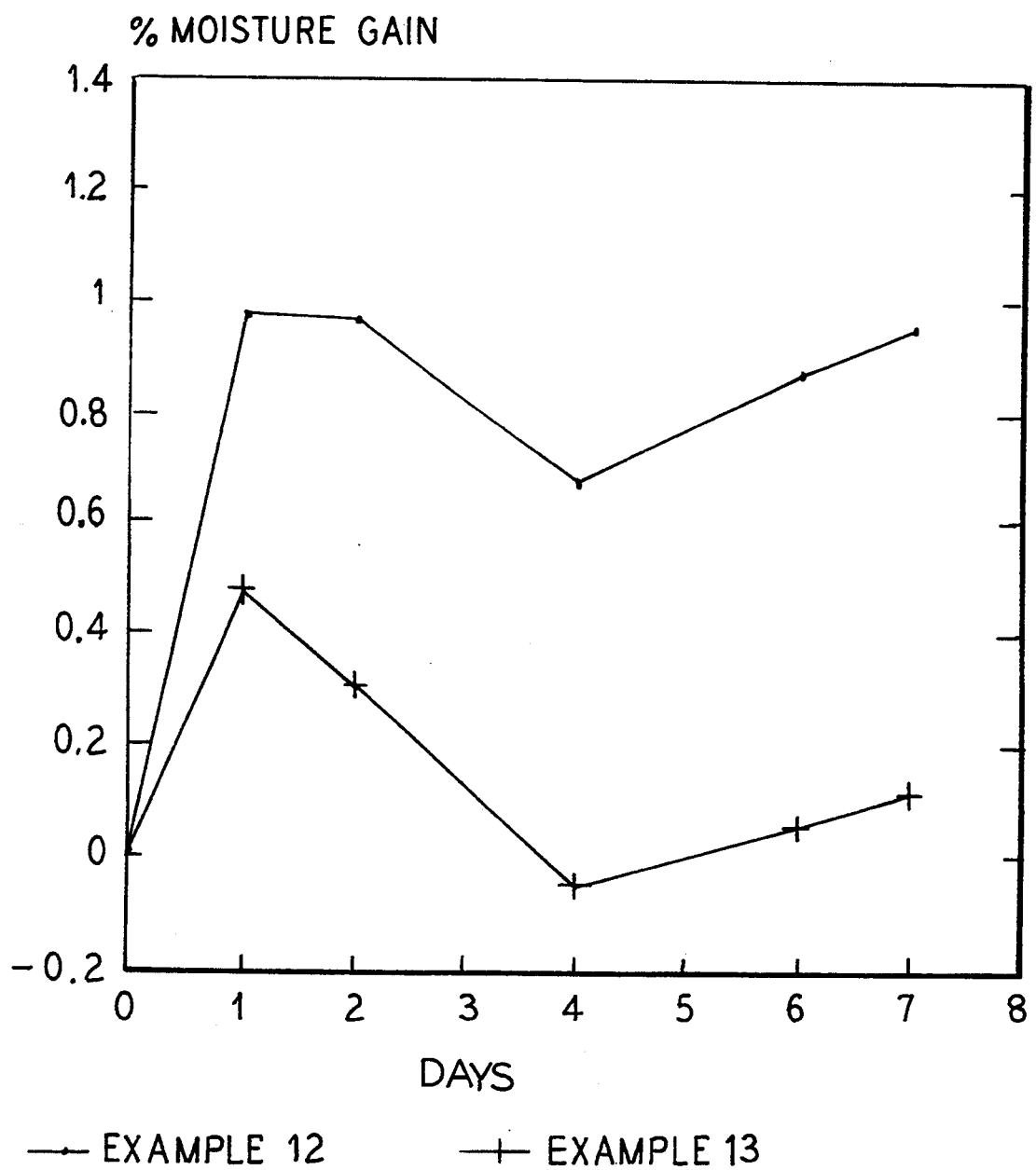

USE OF EDIBLE FILM TO IMPROVE THE PACKAGING OF CHEWING GUM

This is a continuation-in-part of U.S. patent application Ser. No. 07/871,962, filed on Apr. 21, 1992.

BACKGROUND OF THE INVENTION

The present invention relates generally to chewing gum. More specifically, the present invention relates to methods of improving the shelf-life of chewing gum and the packaging of same.

During storage, chewing gum has a tendency to lose or gain moisture from the surrounding atmosphere depending on the surrounding temperature, relative humidity, and packaging, and also depending on the shape and formulation of the chewing gum. Sugar-containing chewing gums, for instance, typically contain corn syrup and a small amount of humectant such as aqueous sorbitol or glycerin. Such sugar-containing chewing gums have a tendency to dry out and become brittle when stored under relatively dry conditions of 50% relative humidity and lower. The tendency of sugar gums to dry out and become brittle is particularly apparent at higher ambient temperatures.

Sugarless chewing gums are typically designed to contain lower amounts of moisture than sugar-containing gums. In sugarless gums which are sweetened with aspartame or other moisture-susceptible artificial sweeteners, it is important to maintain a low moisture content in order to prevent loss of sweetness and flavor qualities. However, due to their low initial moisture content and higher level of hygroscopic ingredients, these sugarless gums tend to gain moisture above 40% relative humidity, causing wetness of the chewing gum and degradation of the aspartame or other moisture-susceptible ingredients.

Various technologies have been developed for the purpose of protecting chewing gum from moisture loss, moisture gain and other adverse changes which result from storage. For example, packaging techniques have been developed which provide sealed, high quality protective packaging for individual chewing gum sticks. One such technique is disclosed in U.S. Pat. No. 5,048,260 to Raymond et al.

For example, it is known to generally package stick chewing gum in a wrapper that comprises a composite material having a tissue or paper substrate that defines an inner surface that contacts the chewing gum and a metal foil outer surface. The foil surface provides moisture and vapor barrier properties to the wrapper.

Typically, the composite wrapper does not provide sufficient barrier properties for long term storage of chewing gum. It is therefore known to house a group of individually wrapped gum sticks in, for example, a package more commonly referred to in the industry as a counterband. The counterband is usually also a composite material, such as, an inner layer of aluminum foil with a paper and/or polypropylene outer surface. The counterband seals the individually wrapped sticks of chewing gum until opened by the customer.

Although the composite wrapper and counterband provide sufficient barrier properties allowing long term storage of chewing gum, they raise a number of issues. One issue is cost. The use of a composite wrapper as opposed to only a paper or tissue wrapper substantially increases the packaging costs. Indeed, for at least certain chewing gum products, the packaging costs can comprise a substantial portion of the product costs. However, for a typical chewing gum composition if a composite wrapper is not used, shelf-life may be substantially compromised. This is especially true once the counterband has been opened. For chewing gums that use only paper on the single piece, the paper offers virtually no protection from the environment.

A further issue is with respect to environmental concerns. Foil wrappers and counterbands do not biodegrade, or are not easily recyclable, and therefore, are not "environmentally friendly." Although environmental concerns have been a concern for a number of years, recently, much greater attention has been focussed on biodegradability and the recycling of materials.

There is a need or desire for improved packaging that still allows for sufficient shelf-life of chewing gum products especially chewing gum sticks.

SUMMARY OF THE INVENTION

The present invention provides an improved method for preparing chewing gum and the packaging of same.

To this end, pursuant to the present invention, a method for packaging at least one stick of chewing gum is provided comprising the steps of preparing a stick of chewing gum that includes a coating of an edible material that provides sufficient vapor barrier properties to provide the stick of chewing gum with a more stable moisture content at ambient conditions than a stick of chewing gum that does not include the coating, and wrapping the stick of chewing gum in a wrapper that does not include any metal foil material to create a wrapped stick of chewing gum.

In an embodiment of the method, the wrapper is constructed from at least one material chosen from the group consisting of: paper; tissue grade paper; cellulose acetate; paper laminates; cellophane; and more environmentally friendly plastics such as polypropylene and polyethylene.

In an embodiment of the method, the coating of edible material includes an edible film chosen from the group consisting of: cellulose derivatives; modified starch; dextrin; gelatin; zein; protein; vegetable gums; shellac; edible polymer films; edible plastic films; and combinations thereof.

In an embodiment of the method, the coating of edible material includes a component chosen from the group consisting of: wax, lipids, fatty acids, fats, and oils. Preferably, the wax is selected from the group consisting of: beeswax; carnauba wax; candelilla wax; microcrystalline wax; paraffin wax; and combinations thereof.

In an embodiment of the method, the coating of edible material comprises: a first layer of an edible film; and a second layer of a material chosen from the group consisting of: wax, lipids, fatty acids, fats, and oils.

In an embodiment of the method, the coating of edible material is an emulsion including at least two materials chosen from the group consisting of: carbohydrates; modified carbohydrates; carbohydrate derivatives, including celluloses, gums, and gum derivatives; proteins; and lipids including waxes, oils, fats, hydrocarbon polymer type waxes, and lipid fatty acid derivatives.

In an embodiment, the emulsion is chosen from the group consisting of: wax emulsions; ethylcellulose emulsions; and pseudolatexes; and colloidal dispersions.

The present invention also provides a method packaging a plurality of chewing gum sticks comprising the steps of: preparing a plurality of sticks of chewing gum;

coating the chewing gum with a sufficient amount of an edible material having at least some barrier properties to create sticks of chewing gum having a more stable moisture content, during exposure to ambient conditions, than a chewing gum stick not so coated; individually wrapping the chewing gum sticks in a wrapper that does not include a metal foil; and packaging a plurality of the chewing gum sticks in a counterband.

In an embodiment, the counterband package does not include any metal foil material.

It is an advantage of the present invention to provide a chewing gum composition that allows for a more environmentally friendly packaging to be used without sacrificing shelf-life.

A still further advantage of the present invention is that it provides a method for packaging chewing gum at least in a wrapper that does not require the use of metal foil.

Still further, an advantage of the present invention is that it allows for the packaging of chewing gum in a paper or tissue substrate wrapper without adversely effecting the shelf-life of the chewing gum.

Moreover, an advantage of the present invention is that it allows, if desired, the packaging of sticks of chewing gum individually in wrappers and as a group in a counterband, without the use of metal foil or other less "environmentally friendly" materials.

Additionally, an advantage of the present invention is that it provides a chewing gum composition that can be used with a packaging that is substantially less expensive than traditional chewing gum packaging.

Additional features and advantages of the present invention are described in, and will be apparent from, the detailed description of the presently preferred embodiments and from the drawings.

BRIEF DESCRIPTION OF THE DRAWINGS

FIG. 8 illustrates the weight gain as a function of time for chewing gum sticks coated on both sides with 0.9 mils (wet) of aqueous HPMC and Victory (microcrystalline) wax, for different thicknesses of Victory wax and for no wax.

FIG. 9 illustrates the weight gain as a function of time for chewing gum sticks coated with different thicknesses of Victory wax only, and no HPMC.

FIG. 10 illustrates the weight gain as a function of time for chewing gum sticks coated on both sides with 0.9 mils (wet) of aqueous HPMC and Besquare 185 (microcrystalline) wax, for different thicknesses of Besquare 185 wax and for no wax.

FIG. 11 illustrates the weight gain as a function of time for chewing gum sticks coated with different thicknesses of Besquare 185 wax only, and no HPMC.

FIG. 12 illustrates the weight gain as a function of time for chewing gum sticks coated with HPMC and Victory wax after the rolling compound has been removed (prepared sample) compared with chewing gum sticks coated with HPMC and Victory wax without removing the rolling compound (unprepared sample).

FIG. 13 illustrates the weight gain as a function of time for chewing gum sticks coated with HPMC only, after the rolling compound has been removed (prepared sample) and without removing the rolling compound (unprepared sample).

FIG. 14 illustrates the weight gain as a function of time for chewing gum sticks coated with Victory wax only, after the rolling compound has been removed (prepared sample) and without removing the rolling compound (unprepared sample).

FIG. 15 illustrates the weight gain as a function of time for a control wrapped chewing gum (tissue/foil/single stick sleeve) and a chewing gum with edible film and a paper only wrapper.

FIG. 16 illustrates the weight gain as a function of time for a control chewing gum (with no wrapper) and a chewing gum with edible film and no wrapper.

DETAILED DESCRIPTION OF THE PRESENTLY PREFERRED EMBODIMENTS

Figure 1:
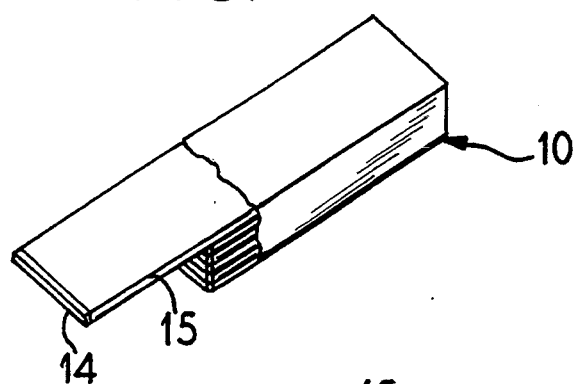
FIG. 1 illustrates a perspective view of an embodiment of the packaging for chewing gum of the present invention illustrating a number of individually wrapped sticks in a counterband package.

Pursuant to the present invention, an improved method for packaging chewing gum products is provided. Due to the manufacturing process used to construct the chewing gum, the individual pieces of chewing gum can be packaged in a wrapper that does not include metal foil or other barrier materials. Rather, the chewing gum can be wrapped in paper or like substances. Indeed, if desired, the individually wrapped chewing gum can be packaged in a counterband that is more "environmentally friendly" than currently used counterbands.

Pursuant to the present invention, the chewing gum piece is coated with an edible material that provides moisture barrier properties. This coating may comprise: a multilayer coating of two or more materials (e.g., a layer of edible film forming agent and a layer of wax); a single layer of material (e.g., a layer of only edible film forming agent); or an emulsion of two or more materials. A variety of different coatings are possible pursuant to the present invention.

What is important is that the chewing gum with the coating of edible material is more moisture stable at ambient conditions than it would be without the coating. As used herein, "edible material" includes any material that does not have to be removed from the chewing gum before it is chewed, i.e., a material that can be chewed and ingested by the consumer.

In accordance with the invention, in an embodiment, a chewing gum composition is provided which has been manufactured, rolled using a dusting or rolling compound, and sheeted according to procedures well known in the art. Of course, if desired, the chewing gum composition does not have to be rolled using a dusting or rolling compound.

The chewing gum sheet is then coated on one surface using an aqueous solution of an edible material, which in this embodiment comprises an edible, water soluble film forming agent. The edible, water soluble film forming agents can include cellulose derivatives, modified starch, dextrin, maltodextrin, polyols, low calorie carbohydrate bulking agents including indigestible dextran, oligofructose, and polydextrose, gelatin, zein, soy protein, whey protein, gluten, and vegetable gums including guar gum, locust bean gum, carrageenan gum, acacia, karaya, ghatti, tragacanth, tamarind gum, agar, alginates, pectin, and xanthan gum. However, it is expected that any edible film forming agent can be used.

In an embodiment, the preferred water soluble film forming agents are cellulose derivatives. These include ethyl cellulose, hydroxypropyl methyl cellulose, methyl cellulose and sodium hydroxymethyl cellulose. Of these, the most preferred water soluble film forming agent is hydroxypropyl methylcellulose (HPMC).

The water soluble film forming agent can be used in an aqueous solution which includes about 5 to about 25 weight percent water soluble film forming agent. In an embodiment, preferably, the aqueous solution includes about 10 to about 20 weight percent water soluble film forming agent, most preferably about 13 weight percent. A commercially available food grade HPMC which is particularly suitable for use in the invention is Methocel E5 available from the Dow Chemical Co., Midland, Mich. A plasticizer may be mixed with the HPMC in order to improve flexibility of the film.

The solution of film forming agent can be applied using a variety of techniques. Such techniques include: co-extrusion; off-set printing—direct roller contact; electrostatic spraying; high-pressure air spraying; pressurized porous roller; vibratory feeder (powder); non-contact off-set printing—doctor blade to remove film from roller; wick (pressure fed brush); auger (powder); enrober equipment; and extrude film and laminate to gum.

For example, the film forming agent can be applied using spraying equipment which is capable of spraying a fine mist of the solution. An example of suitable spraying equipment is the Nordson Model 64B airless sprayer, available from Nordson Corp., Amherst, Ohio. If a spraying technique is used, during spraying, the spraying nozzle should be about 10 inches or slightly less above the chewing gum surface. In an embodiment, a sufficient amount of the solution should be applied to give a wet coating thickness of about 0.25 to about 1.5 mils, preferably about 0.7 to about 1.2 mils, most preferably about 1.0 mils.

If a rolling or dusting compound is used, in some instances, it may be desirable to remove the rolling or dusting compound present on the surface of the chewing gum sheet, before applying the solution of edible film forming agent. Removal of the dusting compound is not always necessary or beneficial, but may be necessary in instances where the edible film forming agent is applied as a relatively thin coating, or is otherwise easily cracked during or after drying. Removal of much of the dusting compound can be accomplished by applying a dry cloth to the surface of the chewing gum sheet, followed by a damp cloth. During production, the rolling compound may alternatively be removed using a brush, vacuum, or other suitable technique.

In an embodiment of the present invention, after the aqueous solution of edible film forming agent has been applied, the solution is allowed to dry partially or until the coating becomes tacky and can no longer flow. The coating should not be so dry that its adhesive properties are lost, or so wet that its adhesive properties are not apparent. The drying can be accomplished over a short period of time of about 30 seconds to about two minutes, depending on the wet thickness of the coating. If desired, the drying can be aided by the use of a forced air blower, using air that is heated to a temperature of preferably no greater than about 120° F.

Depending on the barrier properties of the edible film forming agent, it may be desirable to coat the edible film with another material. To this end, in an embodiment, after the aqueous solution of edible film forming agent has been partially dried to a paste or glue, a layer of wax or other composition can be applied over the edible film forming agent. The types of waxes which are suitable for use with the invention include: natural waxes such as beeswax, carnauba wax, and candellila wax; microcrystalline waxes such as Victory wax, Besquare wax and Star wax; and paraffin waxes. Of these, the preferred wax is beeswax. However, it is envisioned that other components having wax-like properties can be used such as lipids including fatty acids, fats, and oils.

Likewise, as previously stated, if desired, the wax, lipids, fatty acids, fats, and oils, depending on manufacturing issues and barrier properties, may be used alone as the edible material without the edible film 10 material discussed above.

In a similar vein, an emulsion of ingredients can be used and coated on the gum. For example, wax emulsions, ethylcellulose emulsions, pseudolatexes, and colloidal dispersions can be used. In an embodiment of the method, the coating of edible material is an emulsion including at least two materials chosen from the group consisting of: carbohydrates; modified carbohydrates; carbohydrate derivatives, including celluloses, gums, and gum derivatives; proteins; and lipids including waxes, oils, fats, and lipid fatty acid derivatives. U.S. patent application Ser. No. 08/049,813, entitled: "USE OF EDIBLE FILM TO PROLONG CHEWING GUM SHELF LIFE" that is being filed in the name of Marc Meyers on even date herewith, the disclosure of which is hereby incorporated by reference, discloses such emulsions.

Indeed, a great number of ingredients are envisioned for use as the edible film. These include, without limitation: latex-type emulsions, ethylcellulose emulsions; polyvinyl acetate; sorbitan esters; polyoxyethylene sorbitan esters; glycol esters/polyethylene glycol esters; ethoxylated esters; glycerol esters/polyglycerol esters; bacterial cellulose fiber; microparticulated cellulose; cellulose derivatives; sodium alginate, propylene glycol alginate, etc. for gelling with calcium chloride salt; zein solutions; alcoholic shellac; pullulan, cellulosics precasted films with plasticizers; cellulosics films with alcohol and stearic acid, beeswax, refined paraffin wax, hydrogenated palm oil, PEG (polyethylene glycol), lauric acid, palmitic acid, arachidic acid, oleic/linoleic, linolenic acids, eladic acid, carnauba wax, candelilla wax, rice bran wax, and microcrystalline wax; protein films based on gluten, gliadin glutenin or zein; chitosan/chitin; lecithin; ionization of lipid droplets to attach to gum surface; cocoa butter, chocolate; silicon oxides (syloid) $SiO_2$ or $CaSiO_3$; high amylose starch; sugarcane wax; cocoa wax; montan wax; flax and cotton seed wax;

vegetable wax/vegetable oil suspension, including coconut oil, palm kernel oil, soybean oil, corn oil, sesame oil, safflower oil, cottonseed oil, and a combination of above products; mineral oil; oxidized polyethylene; medium chain triglycerides; zein/alcohol solution; sugar esters; extruded cellulosics with PEG; purified shellac with citric acid; preformed films of cellulosics pullulan, etc.; other protein film formers; acetylated monoglycerides; triacetin, tristearin; magnesium stearate, palm oil, palm kernel oil, transhardened veg. oil, cocoa butter, fractionated veg. oil, hydrog. palm kernel stearine;

If wax is used, it is preferably applied in a molten state in order to facilitate uniformity of application and adhesion, but can alternatively be applied as a powder and pressed. An example of equipment which is suitable for applying the wax is the Nordson Model 2302 hot melt wax spray applicator, equipped with an H20T spray gum with a cross-cut nozzle, available from the Nordson Corp., Amherst, Ohio.

If a spraying process is used, during spraying the spraying nozzle should be about one inch above the chewing gum surface, in order to ensure that the wax remains molten until after contacting the previously applied coating of edible film forming agent. In an embodiment, a sufficient amount of the wax is applied to give a wax coating thickness of about 0.5 to about 3.0 mils, preferably about 0.7 to about 2.0 mils, most preferably, about 1.0 mil. The thickness of the wax coating does not change significantly as the wax hardens to a solid.

In an embodiment, after the wax has hardened, then the entire coating process is repeated on the opposite surface of the chewing gum sheet. Alternatively, both sides of the gum can be coated simultaneously. After both sides of the chewing gum sheet have been coated, the chewing gum can be scored, cut into sticks and wrapped. In an alternative embodiment, the chewing gum can be scored and cut into sticks before one or both surfaces have been coated.

A chewing gum composition generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including, but not limited to, sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include, but are not limited top sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1-15% by weight of the chewing gum, preferably between about 0.2-5% by weight of the chewing gum, most preferably between about 0.5-3% by weight of the chewing gum. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into sticks. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further, parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

After the chewing gum is created, it can be packaged pursuant to the present invention. Due to the barrier properties of the edible material (which can comprise, as set forth above, an edible film forming agent, a wax, lipid, or other coating, a multi-layer structure including the edible film and wax or lipid, or an emulsion) pursuant to the present invention, improved packaging from an environmental and cost standpoint can be achieved.

Figure 2:
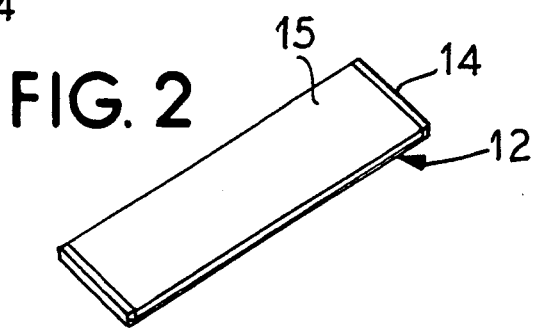
FIG. 2 illustrates an embodiment of an individually wrapped stick of chewing gum in the packaging of the present invention.
Figure 3:
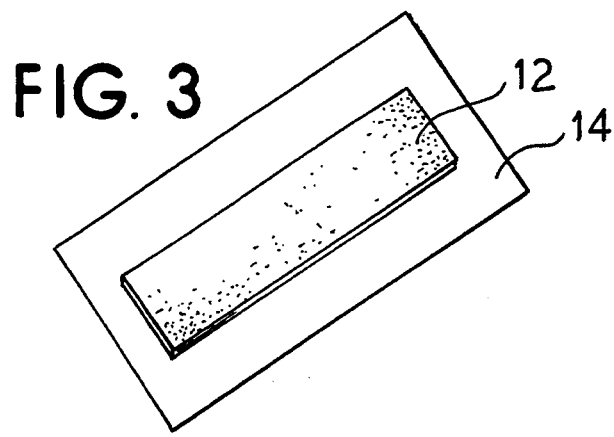
FIG. 3 illustrates the chewing gum stick of FIG. 2 with the wrapper opened.

In this regard, referring to FIGS. 1-3, and specifically FIG. 1, a package 10 of chewing gum constructed pursuant to the present invention is illustrated. In the illustrated embodiment, chewing gum sticks 12 are packaged. Initially, as illustrated in FIG. 2, each chewing gum stick 12 is individually wrapped in a wrapper 14. In the illustrated embodiment, the wrapper is enclosed, in part, by a paper sleeve 15. The paper sleeve 15 contains the label and other indicia for chewing gum sticks. However, if desired, a sleeve need not be used.

Pursuant to the present invention, the wrapper 14 does not include any metal foil as part of its construction. Instead, the wrapper 14 is preferably constructed from a paper or tissue substrate. However, other more "environmentally friendly" materials can be used to construct the wrapper 12, such as: cellophane; cellulose acetate; plastics; and laminates that do not include foil such as, for example, a paper/polypropylene laminate.

Although the wrapper 14 comprises only paper or other inexpensive and/or environmentally friendly substrates, the wrapped chewing gum 12 has an extended shelf life. Examples 12-13 set forth below, provide comparisons of chewing gum compositions of the present invention vis-a-vis "typical" gum formulations in the wrapper 12.

As discussed in more detail hereinafter, the examples demonstrate much better shelf life for the compositions of the present invention in the wrapper 14 as compared to typical chewing gum formulations. However, due to the construction of the chewing gum, paper or other like material can be used for the wrapper 14 to provide a much cheaper packaging material. This substantially reduces the cost to manufacture a package of chewing gum. Additionally, the paper wrappers provide an environmentally friendly material addressing the environmental concerns that have heretofore been raised.

Preferably, the individually wrapped sticks of gum 12 are then wrapped in a package or counterband 16; see FIG. 1. The counterband 16 further seals the sticks of gum 12. To this end, the counterband 16 encloses the sticks of chewing gum 12. To provide access, the top (not shown) of the counterband is removed as is known in the art.

It may be, due to long term storage issues, that the counterband 16 will be a typical counterband, for example, constructed from a composite material including foil and polyethylene/paper/polypropylene laminates. Even if such a counterband 16 is used, however, the present invention still provides advantages over the prior art with respect to the individual wrappers 14. Typical wrappers that include metal foil, substantially increase the environmental burden, as well as the cost of the packaging.

However, pursuant to the present invention, the counterband 16 can be constructed so that it does not include any metal foil and/or is constructed from a more environmentally friendly material. The counterband 16 then would be constructed from, for example: paper; plastics, such as polypropylene; cellophane; or laminates.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1-13 (GENERAL PROCEDURE)

The following chewing gum formulation was prepared for use in a variety of trials described hereinafter in the Examples:

| Component | Weight Percent |
|---|---|
| Gum Base | 24.4 |
| Sorbitol | 48.75 |
| Coevaporated blend of 67.5% Lycasin hydrogenated starch hydrolysate solids, 25% glycerin and 7.5% water | 9.1 |
| Mannitol | 8.0 |
| Glycerin | 7.7 |
| Peppermint Flavor | 1.6 |
| Encapsulated Aspartame | 0.2 |
| Brown Color Dispersion | 0.05 |
| 10% Salt Solution | 0.05 |
| Lecithin | 0.15 |
| TOTAL | 100.00 |

For purposes of the following Examples, the chewing gum was rolled using a mannitol rolling compound, sheeted, scored and cut into sticks. Then, the chewing gum sticks were coated according to the following general procedure. For some of the samples used in the following Examples, one or more steps of the procedure were omitted, as will become hereinafter apparent.

Procedure a. Remove the rolling compound from the chewing gum sticks by wiping with a dry cloth, followed by a damp cloth. Allow the chewing gum sticks to dry.

b. Flush a Nordson hot melt wax spray applicator for 10-15 minutes using the appropriate wax.

c. Apply a coating of Methocel E5 solution (13.3% HPMC in water) to one surface of the chewing gum stick, using a Nordson airless solution sprayer. Using an air dryer with low heat (about 120° F.), dry the aqueous HPMC coating partially until it becomes tacky, and will not flow. Drying time should generally be no longer than about 30 seconds to about two minutes.

d. Apply a coating of wax over the partially dried coating of Methocel E5. Allow the wax to harden.

e. Repeat steps "a" through "d" for the opposite surface of the chewing gum sticks.

After the chewing gum sticks were coated on both sides, the coated samples (unwrapped) were stored under controlled conditions of 58% relative humidity and 85° F., for several days. The samples were weighed periodically in order to calculate the percent weight change due to moisture pickup. The results were plotted in FIGS. 4–14. In order to facilitate a clear understanding of these graphs, the comparisons made in each of the Figures are discussed individually in the following Examples 1-11.

EXAMPLE 1

Figure 4:
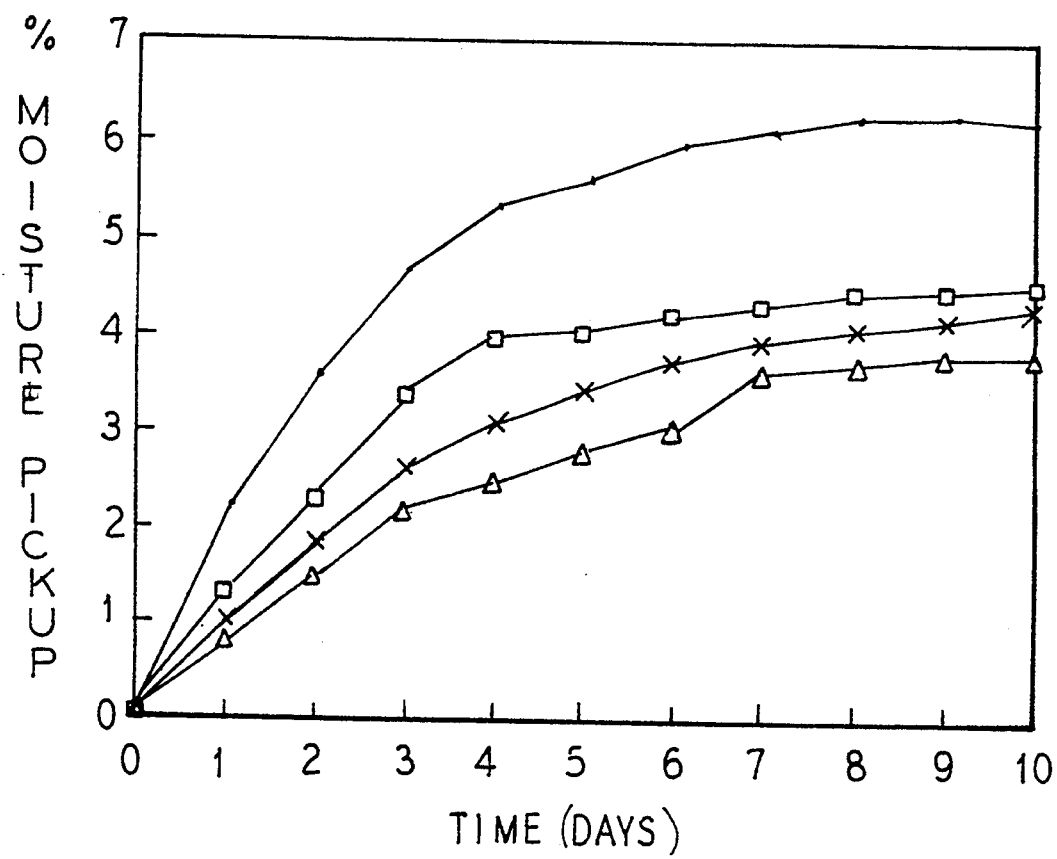
FIG. 4 illustrates the weight gain as a function of time for chewing gum sticks coated on both sides with 0.9 mils (wet) of aqueous hydroxypropyl methylcellulose (HPMC) and beeswax, for different thicknesses of wax coating, at 58% relative humidity and 85° F.

Referring to FIG. 4, chewing gum sticks were coated on both sides with a 0.9 mil coating of 13.3% Methocel E5 solution (measured before any drying occurred) and with various thicknesses of beeswax. the sample designated as "control" consisted of sticks of the chewing gum without any coating of HPMC or wax, which were "unprepared" (i.e., without the rolling compound removed). The remaining samples were "prepared" (i.e., the rolling compound was removed), were coated with aqueous HPMC, and were coated with 0.9, 1.65 and 3.0 mils of beeswax, respectively.

FIG. 4 indicates that the "control" chewing gum sample picked up more than six weight percent additional moisture from the surrounding atmosphere, over the 10-day storage period. The remaining samples, which exemplified a preferred embodiment of the invention (a preferred edible film forming agent and a preferred wax) showed at least a 30% reduction in moisture pickup, for the 10 days. The reduction in moisture pickup improved somewhat as the thickness of the beeswax increased.

EXAMPLE 2

Figure 5:
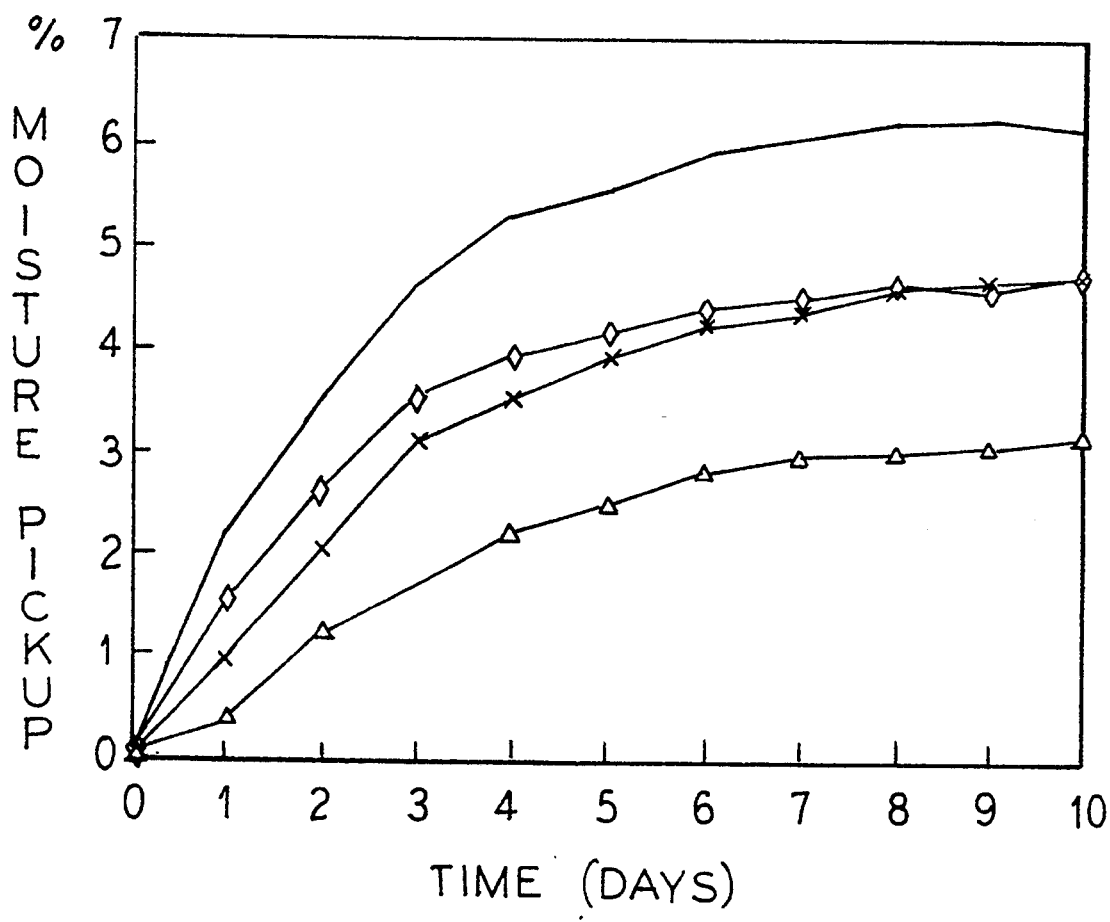
FIG. 5 illustrates the weight gain as a function of time for chewing gum sticks coated with different thicknesses (wet) of aqueous HPMC, and no wax.

Referring to FIG. 5, chewing gum sticks prepared by removing the rolling compound, and coated with various thicknesses of 13.3% Methocel E5 solution (measured before drying), but not coated with any wax, were compared to the unprepared, uncoated chewing gum control sticks. Coatings of 0.50 and 0.90 mil of Methocel E5 solution (measured before drying) resulted in about a 25% reduction in moisture pickup over the 10-day period, compared with the control. A coating of 1.50 mils of Methocel E5 solution caused further improvement, resulting in a reduction in moisture pickup of more than 50%, compared with the control.

EXAMPLE 3

Figure 6:
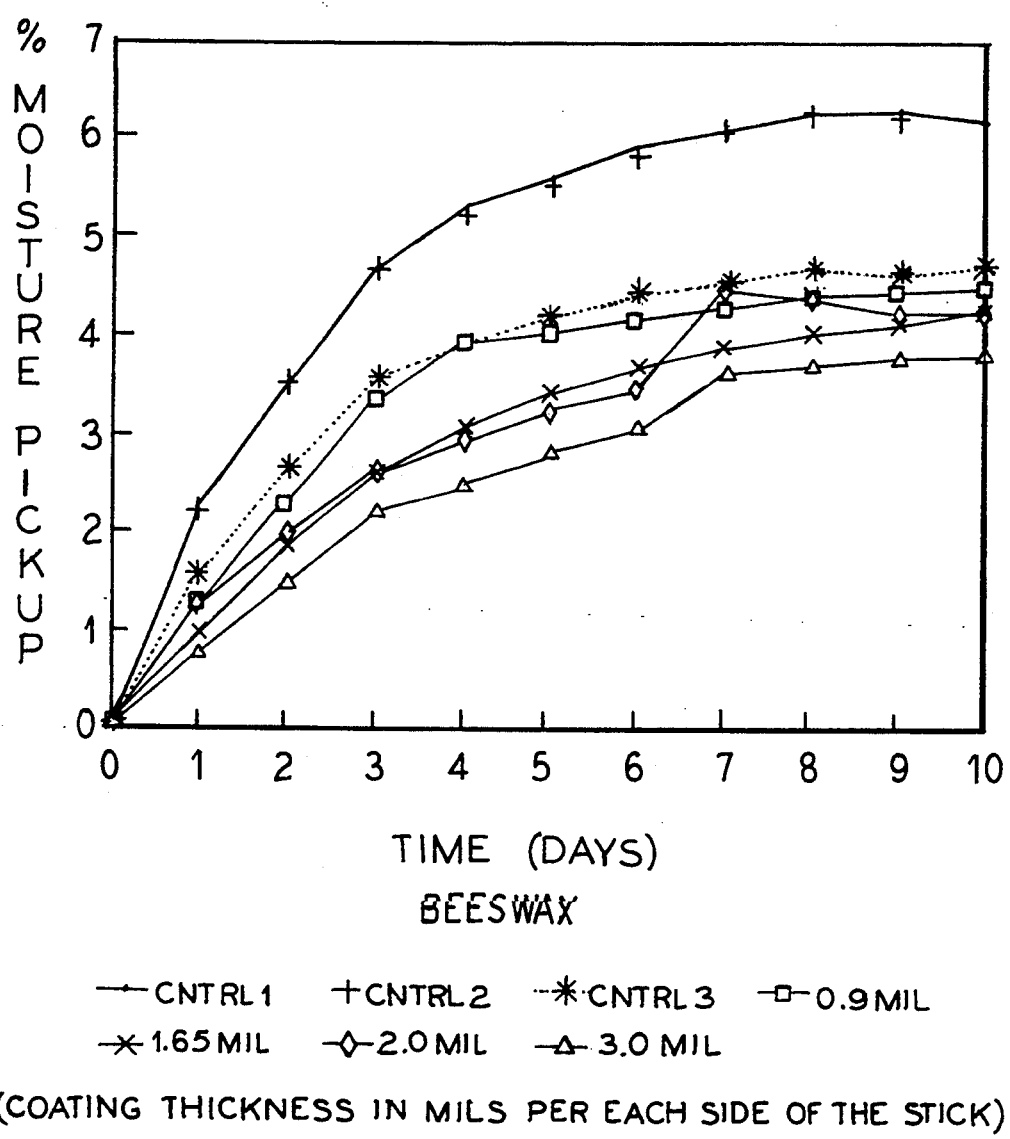
FIG. 6 illustrates the weight gain as a function of time for chewing gum sticks coated on both sides with 0.9 mils (wet) of aqueous HPMC and beeswax, for different thicknesses of beeswax and for no wax.

Referring to FIG. 6, the sample called "Control 1" refers to the chewing gum sticks, which were uncoated and unprepared (i.e., with the rolling compound intact). The sample called "Control 2" refers to the uncoated chewing gum sticks, which were "prepared" by removing the rolling compound. The sample called "Control 3" refers to prepared chewing gum sticks, coated on both sides with 0.9 mil of 13.3% Methocel E5 solution (measured before drying) but not coated with any wax. The remaining sample consisted of prepared chewing gum sticks coated with 0.9 mil of Methocel E5 solution (measured before drying) and further coated with 0.9, 1.65, 2.0 and 3.0 mils, respectively, of beeswax.

Control 1 and Control 2 both picked up more than 6% by weight additional moisture in 10 days, indicating that removal of the rolling compound had no significant effect on moisture pickup. Control 3 picked up about 4.7% by weight additional moisture, indicating significant improvement resulting from the coating with HPMC alone. The remaining samples showed further reduction of moisture pickup resulting from coating with beeswax in addition to HPMC, with the reduction being more pronounced as the thickness of beeswax was increased.

EXAMPLE 4

Figure 7:
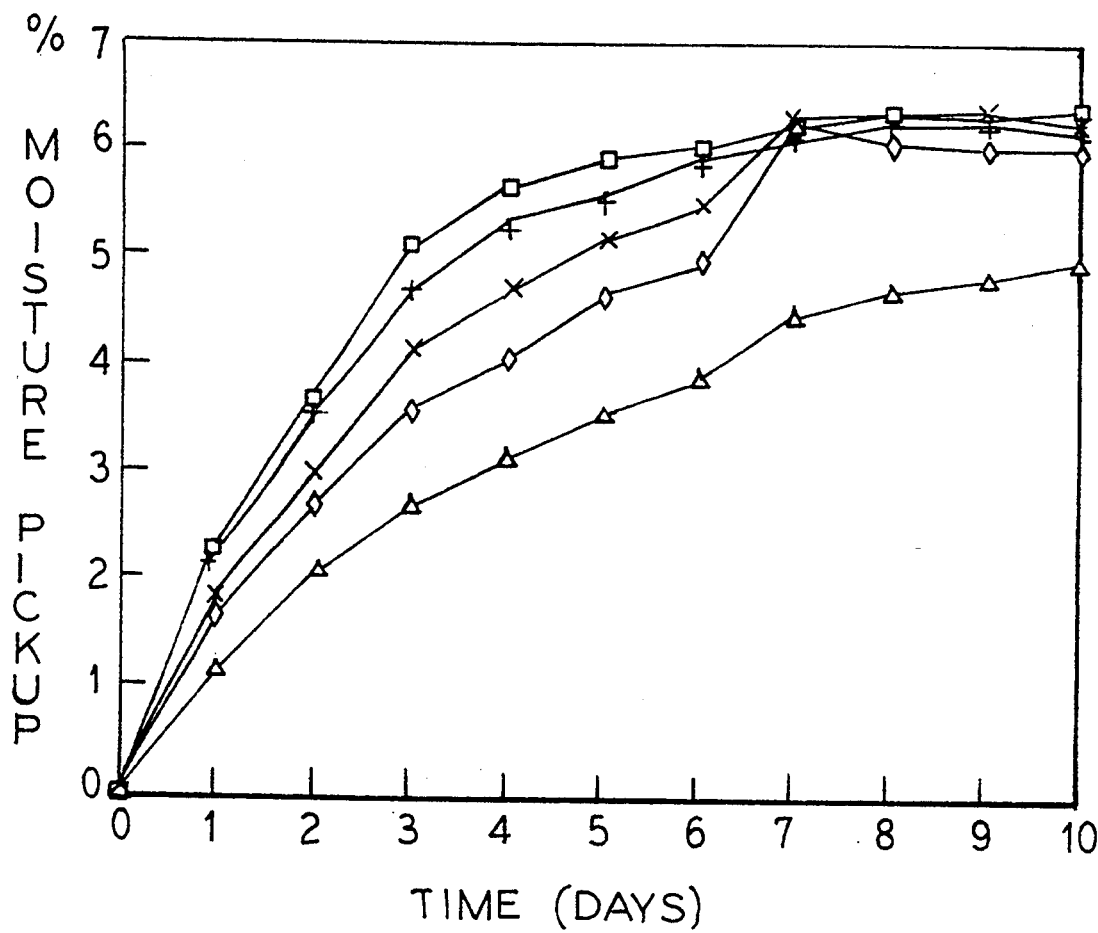
FIG. 7 illustrates the weight gain as a function of time for chewing gum sticks coated with different thicknesses of beeswax only, and no HPMC

Referring to FIG. 7, the samples called "Control 1" and "Control 2" are the same as described above in Example 3. The remaining samples were prepared chewing gum sticks coated with 0.9, 1.65, 2.0 and 3.0 mils, respectively, of beeswax, but not coated with HPMC. While the beeswax alone caused some reduction in moisture pickup, particularly at 3.0 mils, the reduction was much less than when the chewing gum sticks were coated with HPMC and beeswax. This can be seen by comparing FIG. 5 and FIG. 4.

EXAMPLE 5

Referring to FIG. 8, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.45, 1.1, 1.65, 2.0 and 3.0 mils, respectively, of Victory wax. Victory wax is a synthetic microcrystalline wax available from the Petrolite Company in Tulsa, Oklahoma, and is softer than beeswax.

Comparison of the wax-coated samples with Controls 1 and 2 indicates that the samples with wax coatings 1.1 mils and above (in addition to HPMC) showed reduced moisture pickup after 10 days, compared with the uncoated chewing gum sticks. The sample with a wax coating of 0.45 mils did not show a consistent or overall improvement in moisture pickup. Comparison of the wax-coated samples with Control 3 indicates that only the thickest of the wax coatings, 3.0 mils, showed further reduction in moisture pickup compared with the chewing gum sticks coated with HPMC and no wax.

EXAMPLE 6

Referring to FIG. 9, the samples called "Control 1" and "Control 2" are the same as described above in Example 3. The remaining samples were prepared chewing gum sticks coated with 0.45, 1.1, 1.65, 2.0 and 3.0 mils, respectively, of Victory wax, but not coated with HPMC. Only the thickest of wax coatings, 2.0 and 3.0 mils, showed consistent reductions in moisture pickup compared to the uncoated chewing gum controls.

EXAMPLE 7

Referring to FIG. 10, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.65, 1.1, 1.65, 2.1 and 3.1 mils, respectively, of Besquare 185 wax. Besquare 185 is a synthetic microcrystalline wax available from the Petrolite Co. in Tulsa, Okla. Besquare 185 is harder and more crystalline than Victory wax and has a less branched, more linear molecular structure.

Comparison of the wax-coated samples with Controls 1 and 2 indicates that, in general, the samples with wax coatings in addition to HPMC showed, reduced moisture pickup after four days, compared with the uncoated chewing gum sticks.

EXAMPLE 8

Referring to FIG. 11, the samples called "Control 1" and "Control 2" are the same as described above in Example 3. The remaining samples were prepared chewing gum sticks coated with 0.65, 1.1, 1.65, 2.1 and 3.1 mils, respectively, of Besquare 185 wax, but not coated with HPMC.

Some of the wax-coated samples showed reduced moisture pickup compared with the uncoated chewing gum sticks, while others did not. There was no recognizable correlation between the thickness of the wax coating and the amount of moisture pickup, possibly due to cracking of the relatively hard wax.

EXAMPLE 9

Referring to FIG. 12, the samples called "Control 1" and "Control 2" are the same as described above in Example 3. One of the remaining samples consisted of prepared chewing gum sticks coated with 0.9 mils of 13.3% Methocel E5 solution (measured before drying) and 1.1 mils of Victory wax. The other of the remaining samples consisted of unprepared chewing gum sticks coated with 1.1 mils of Methocel E5 solution and 1.1 mils of Victory wax.

From the data, it cannot be said that the prepared chewing gum sticks coated with HPMC and wax, absorbed less additional moisture than the unprepared chewing gum sticks, coated with HPMC and wax. Both coated samples showed reduced moisture pickup compared to the uncoated chewing gums sticks.

EXAMPLE 10

Referring to FIG. 12, the samples called "Control 1" and "Control 2" are the same as described above in Example 3. One of the remaining samples consisted of prepared chewing gum sticks coated with 0.9 mils of 13.3% Methocel E5 solution (measured before drying) but not coated with wax. The other of the remaining samples consisted of unprepared chewing gum sticks coated with 1.1 mils of Methocel E5 solution, but not coated with wax.

Again, whether or not the dusting compound was removed prior to coating, made no difference in the performance of the samples coated with HPMC. Both coated samples showed reduced moisture pickup compared to the uncoated chewing gum sticks.

EXAMPLE 11

Referring to FIG. 14, the samples called "Control 1" and "Control 2" are the same as described above in Example 3. The remaining samples consist of prepared and unprepared chewing gum sticks coated with 1.1 mils of Victory wax but no HPMC.

Neither of the samples coated with Victory wax, but not HPMC, showed a reduction in moisture pickup compared to the uncoated chewing gum sticks.

EXAMPLES 12–13

Another quantity of chewing gum was prepared according to the formula specified previously and used in the following examples. As described previously, Example 12 was rolled using a mannitol rolling compound, sheeted, scored, and cut into sticks. It was then wrapped with a conventional tissue foil laminate, and single stick sleeve.

Example 13 was coated with an edible film as described in previous procedures using 1.0 mil/side coating of 13.3% Methocel E5 solution and 1.0 mil/side coating of beeswax. The film coated gum was then wrapped in non-foil tissue paper as a single stick sleeve. Both examples were then wrapped in a conventional foil/paper/polypropylene laminate counterband for long term storage.

For an accelerated shelf life test at 74° F. and 50% R.H., the counterband of Examples 12 and 13 were removed and the gum with its remaining wrapping was stored in the test conditions at 74° F. and 50% R.H. An initial stick weight was taken and samples were weighted after 1, 2, 4, 6, and 7 days and the moisture gain is weight pickup calculated. Results are shown in FIG. 15.

In FIG. 16, the accelerated shelf life test at 50% R.H. and 74° F. for Examples 12 and 13 was done with bare sticks with all wrapping materials removed. These results show that the edible film applied to stick gum gives significantly reduced moisture gain and an improved shelf life compared to gum without an edible film. In FIG. 15, even paper wrapped gum with edible film gives a lower moisture gain and shelf life protection compared to a foil wrapped gum.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A method for packaging at least one stick of chewing gum comprising the steps of:

preparing a stick of chewing gum that includes a coating of an edible material that provides sufficient vapor barrier properties to provide the stick of chewing gum with a more stable moisture content, under ambient conditions, than a stick of chewing gum that does not include the coating; and wrapping the stick of chewing gum in a wrapper that does not include any metal foil material to create a wrapped stick of chewing gum.

2. The method of claim 1 comprising the further step of packaging a plurality of wrapped sticks of chewing gum in a counterband package.

3. The method of claim 1 wherein the counterband package does not include any metal foil material.

4. The method of claim 1 wherein the wrapper is constructed from at least one material chosen from the group consisting of: paper; tissue grade paper; cellulose acetate; paper laminates; plastic; and cellophane.

5. The method of claim 1 wherein the coating of edible material includes an edible film chosen from the group consisting of: cellulose derivatives; modified starch; dextrin; gelatin; zein; vegetable gums; proteins; edible polymers; edible plastic film; maltodextrins; polyols; low calorie carbohydrate bulking agents; shellac; and combinations thereof.

6. The method of claim 1 wherein the coating of edible material includes a component chosen from the group consisting of: wax, lipids, fatty acids, fats, oils, and hydrocarbon polymer type waxes.

7. The method of claim 6 wherein the wax is selected from the group consisting of: beeswax; carnauba wax; candelilla wax; microcrystalline wax; paraffin wax; and combinations thereof.

8. The method of claim 1 wherein the coating of edible material comprises:
a first layer of an edible film forming agent; and
a second layer of a material chosen from the group consisting of: wax, lipids, fatty acids, fats, oils, and hydrocarbon polymer type waxes.

9. The method of claim 1 wherein the coating of edible material is an emulsion including at least two materials chosen from the group consisting of: carbohydrates; modified carbohydrates; carbohydrate derivatives; proteins; and lipids.

10. The method of claim 1 wherein the coating of edible material includes an emulsion chosen from the group consisting of wax emulsions; ethylcellulose emulsions; pseudolatexes; and colloidal dispersions.

11. The method of claim 1 wherein the stick of chewing gum includes a first side and a second side and the coating of edible material is applied to each of the first and second sides.

12. A method for packaging a plurality of chewing gum sticks comprising the steps of:
preparing a plurality of sticks of chewing gum;
coating the sticks of chewing gum with a sufficient amount of an edible material having at least some barrier properties to create sticks of chewing gum having a more stable moisture content, during exposure to ambient conditions, than a chewing gum stick not so coated;
individually wrapping the chewing gum sticks in a wrapper that does not include a metal foil; and
packaging a plurality of the chewing gum sticks in a counterband.

13. The method of claim 12 wherein the counterband package does not include any metal foil material.

14. The method of claim 12 wherein the wrapper is constructed from at least one material chosen from the group consisting of: paper; tissue grade paper; cellulose acetate; paper laminates; and cellophane.

15. The method of claim 12 wherein the coating of edible material includes an edible film chosen from the group consisting of: cellulose derivatives; modified starch; dextrin; gelatin; zein; vegetable gums; whey proteins; edible polymers; edible plastic film; maltodextrins; low calorie carbohydrate bulking agents; shellac; and combinations thereof.

16. The method of claim 12 wherein the coating of edible material includes a component chosen from the group consisting of: wax, lipids, fatty acids, fats, oils, and hydrocarbon polymer type waxes.

17. The method of claim 12 wherein the coating of edible material comprises:
a first layer of an edible film; and
a second layer of a material chosen from the group consisting of: wax, lipid, fatty acids, fats, oils, and hydrocarbon polymer type waxes.

18. The method of claim 12 wherein the coating of edible material includes an emulsion chosen from the group consisting of wax emulsions; ethylcellulose emulsions; pseudolatexes; and colloidal dispersions.

19. The method of claim 12 wherein the stick of chewing gum includes a first side and a second side and the coating of edible material is applied to each of the first and second sides.

20. A method for packaging a plurality of chewing gum sticks comprising the steps of:
preparing a plurality of sticks of chewing gum;
coating the chewing gum with a sufficient amount of an edible material having at least some barrier properties to create sticks of chewing gum having a more stable moisture content, during exposure to ambient conditions, than a chewing gum stick not so coated;
individually wrapping the chewing gum sticks in a wrapper that does not include a metal foil; and
packaging a plurality of the chewing gum sticks in a counterband wherein the wrapper and counterband are biodegradable.

21. The method of claim 20 wherein the coating of edible material comprises:
a first layer of an edible film forming agent; and
a second layer of a material chosen from the group consisting of: wax, lipid, fatty acids, fats, oils, and hydrocarbon polymer type waxes.

* * * * *